June 8, 1965    I. D. PRESS ETAL    3,188,117
HOSE COUPLING HAVING A CONTINUOUS OUTER SHEATH
Filed March 3, 1961
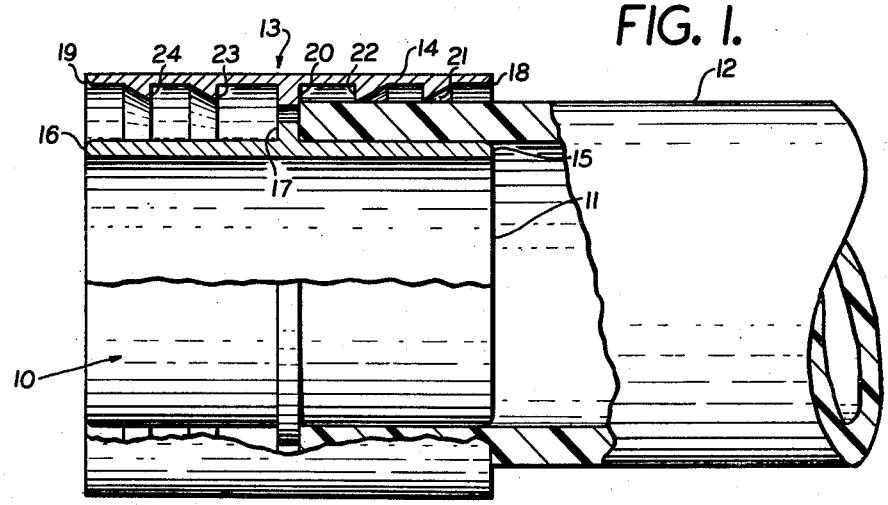
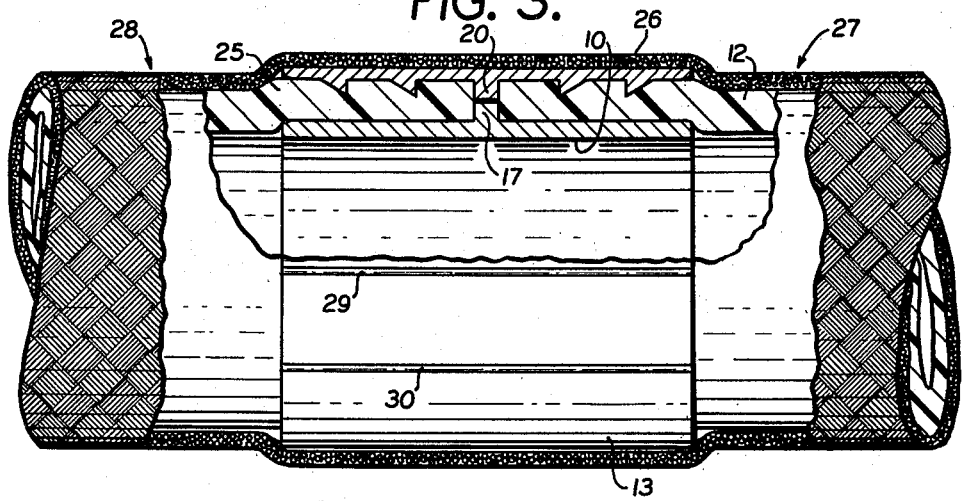
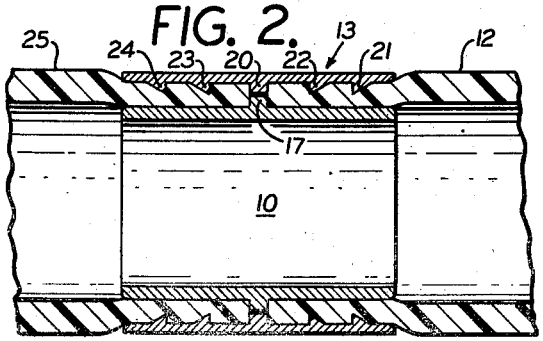
INVENTORS
IRVING. D. PRESS
CHARLES E. FREDERICKSON
BY
*Byerly, Townsend, Watson & Churchill*
ATTORNEYS.

3,188,117
HOSE COUPLING HAVING A CONTINUOUS OUTER SHEATH
Irving D. Press, West Orange, and Charles E. Frederickson, Summit, N.J., assignors to Resistoflex Corporation, Roseland, N.J., a corporation of New York
Filed Mar. 3, 1961, Ser. No. 93,213
2 Claims. (Cl. 285—55)

The present invention relates to a flexible hose construction.

In the manufacture of flexible hose from a resin such as polytetrafluoroethylene (hereinafter abbreviated P.T.F.E) no satisfactory process has as yet been developed for producing the tubing in continuous lengths. Extrusion of thin-walled tubing from P.T.F.E. is accomplished batchwise with a limit on the length of any one piece varying in accordance with the size and wall thickness thereof. Thus, for tubing having a nominal diameter of 5/16 inch it has not been practical to produce lengths greater than 25 feet. There are many instances, however, when greater lengths are desired or required. Heretofore, it has been necessary to interconnect a series of 25 foot long or shorter hose assemblies in order to provide a longer line. Naturally, the additional end fittings raise the cost of the line, are susceptible of accidental uncoupling, interfere with satisfactory winding on drums or reels, and are otherwise undesirable.

Flexible hose of P.T.F.E. is commonly reinforced with a braided sheath woven directly on the lining tube usually from steel wire. All known fittings for use on P.T.F.E. hose are designed to be secured both to the braid and the lining tube, and are attached to the hose after braiding.

Because of the batchwise nature of P.T.F.E. tube production, it oftentimes happens that imperfections appear somewhere along an extruded length resulting in only short salvagable lengths. P.T.F.E. is still a very expensive resin and so manufacturers have developed stockpiles of odd lengths of tubing waiting for a customer that might just require the particular size hose that can be made from it.

With the foregoing in mind an arrangement was discovered whereby the short lengths of P.T.F.E. tubing could be spliced together in such a way that the joint would be fluid tight and at the same time adaptable to being passed through the standard wire braiding machines. It should be understood that the wire is applied under tension in a braiding operation such that any change in diameter of the tubing being covered results in abrupt tension changes, shock to the machinery, and so forth. Furthermore, any change in diameter will affect the braiding angle as well. Nevertheless, the arrangement according to the present invention does not interfere with satisfactory high speed braiding.

In accordance with the present invention, a fluid tight plastic liner having at least one fluid tight mechanical splice therein is surrounded with a continuous fluid pervious braided reinforcing sheath.

More particularly, in accordance with the present invention, discrete lengths of a plastic tube, e.g., of P.T.F.E., are joined end-to-end by a double ended nipple and socket to provide a fluid tight conduit, and then ensheathed in a continuous jacket of braided wire embracing the conduit along its entire length including the socket.

The invention will be better understood after reading the following detailed description of a specific embodiment thereof with reference to the appended drawing in which:

FIG. 1 is a view partly in section and partly broken away showing the double ended nipple and socket in place on the end of one section of tubing prior to contraction of the socket;

FIG. 2 is a view similar to FIG. 1 after insertion of the second section of tubing and after the socket has been contracted to provide the fluid tight joint but before the application of the sheath; and FIG. 3 is a view similar to FIG. 1 showing the completed splice with the braided sheath in place.

Referring now to FIG. 1, the double ended nipple is shown at 10 with one end 11 inserted into the end of plastic tube 12. The double ended socket is shown at 13 with one end 14 telescoped over the end of the tube 12. The parts are represented in their initial condition prior to swaging or contraction of the socket.

The nipple 10 is preferably formed from a martinsitic steel, type 416 stainless, which has been hardened by heat treatment. It has slightly rounded edges 15 and 16 at its ends and an external annular shoulder 17 located at its mid-point. The height of the shoulder should be slightly less than one half the wall thickness of the tube 12 in order to allow for squeezing of the tube end during contraction of the socket.

In order to enable the socket 13 to be contracted, it is preferably formed from an austenitic steel such as type 304 stainless. It also has its edges rounded at 18 and 19 and has an internal annular shoulder 20 at its midsection. The height of the shoulder 20 may be the same as that of the shoulder 17, and preferably slightly less than one half the wall thickness of the tube 12. Of course, one shoulder, 17 or 20, can be smaller and the other larger by the same amount so long as they have sufficient height to act as an abutment and locator for the end of the tube 12 and do not interfere with contraction of the socket.

In order to ensure a tight grip on the end of the tube 12 and ensure against leakage, the interior of each end of the socket is provided with one or more annular ribs, e.g., 21, 22, 23 and 24, of buttress cross-section with the ramp sides facing the respective open ends of the socket. The minimum diameter of the ribs 21, 22, 23 and 24 should be approximately the same as the initial outside diameter of the tube 12. A slight interference is presently preferred to a slip fit. An interference of a few thousandths of an inch can be tolerated; however, the interference should not be so great as to preclude easy hand insertion of an end of the plastic tube into the cavity formed between the nipple and the socket. This is important when it is remembered that the nipple and the socket are already telescoped (see FIG. 1) when the second tube is to be inserted. On the other hand, a slight interference will be found helpful in holding the parts together prior to contraction of the socket. The height of the ribs 21, 22, 23 and 24 is dictated by many considerations, not forming a part of the present invention. Satisfactory results have been obtained, however, using ribs having a height of 0.011 to 0.012 inch.

FIG. 2 shows the sub-assembly of FIG. 1 after insertion of a second section of tubing 25 and after contraction of the socket. The same reference numerals are used in both FIGS. 1 and 2 to designate the same parts.

It should be observed from FIG. 2 that the ribs 21, 22, 23 and 24 are now entirely embedded in the surface of the tubing 12 and 25. By suitable dimensioning of the parts the outside diameter of the socket 13 after contraction can be made approximately equal to the outside diameter of the tubing 12 and 25 external to the socket. For this purpose, the outside diameter of the ends of the nipple can be made slightly smaller than the initial inside diameter of the tubing, and the thickness of the socket can be kept as small as possible consistent with appropriate strength. Furthermore, if the plastic tubing 12 and 25 is made of P.T.F.E., although it is theoretically incompressible, it will be found that due to longitudinal flow a slight reduction in wall thickness will result from contraction of the socket.

After the sections of plastic tube or liner are joined as shown in FIG. 2 to provide a fluid tight conduit with a mechanical splice, it can be passed through standard wire braiding machines for ensheathing. As a matter of fact, an unlimited number of sections of liner can be joined by the double ended fittings prior to braiding.

It was mentioned above that braiding is accomplished at high speeds with the wire strands under considerable tension. Thus, the finished hose in the vicinity of the splice will look as shown in FIG. 3. The fluid pervious braided reinforcing sheath is shown at 26 extending as a continuous jacket throughout the length of the hose. In the regions 27 and 28, beyond the fitting, the sheath causes the tubing 12 and 25 to be reduced in diameter. Again, the dimensioning should be chosen such that the regions 27 and 28 are approximately equal to the inside diameter of the nipple 10. In this manner the mechanical splice is incorporated without altering the size of the fluid passage through the hose.

The presently preferred method of contracting the socket is by means of a set of radial dies. These leave a series of score lines such as 29 and 30 around the outer surface of the socket. However, such marks have not been found objectionable in producing the final product.

Although an austenitic steel socket and martinsitic steel nipple are presently preferred for providing an optimum high performance hose, other types of steel and, in fact, other metals may be employed. The prime considerations are that the nipple be strong enough to withstand the forces of contraction of the socket without collapsing, and that the socket be sufficiently deformable to permit the obtaining of a tight grip on the tubing.

Having described the invention with reference to a presently preferred embodiment thereof, it should be understood by those skilled in the art that numerous changes may be made therein without departing from the true spirit of the invention as defined in the appended claims.

What is claimed is:

1. A flexible hose comprising at least two discrete lengths of plastic tube joined end-to-end by a double ended nipple and socket, adjacent ends of the tubes being positioned between the nipple and the socket, said nipple and socket including means for securing said tube ends thereto to provide a fluid-tight conduit, and a continuous sheath of braided wire embracing the entire conduit including said socket, the diameter of the hose outside of said socket being reduced by the tension in the braid such that the internal diameter of the tube thereof is approximately equal to the internal diameter of the nipple, the external diameter of the sheath being greater where it overlies said socket than where it engages said hose by an amount substantially equal to the reduction in diameter of said hose caused by said sheath.

2. A flexible hose according to claim 1, wherein the socket is contracted radially to compress the plastic tube against the nipple, the nipple and socket being dimensioned relative to the dimensions of the plastic tube such that the contracted external diameter of the socket approximates the outer diameter which the tube external to the socket had prior to addition of the sheath.

References Cited by the Examiner

UNITED STATES PATENTS

| | | | |
|---|---|---|---|
| 330,873 | 11/85 | Cobb | 285—55 |
| 570,405 | 10/96 | Jerguson | 138—120 |
| 714,243 | 11/02 | Sargent | 285—371 |
| 792,913 | 6/05 | Mulconroy | 285—371 |
| 1,235,671 | 8/17 | Fay | 285—423 |
| 1,329,121 | 1/20 | Hackman | 285—371 |
| 1,762,548 | 6/30 | Davis | 285—149 |
| 2,305,644 | 12/42 | Stone | 138—127 |
| 2,442,193 | 5/48 | Brazier | 174—84 |
| 2,742,384 | 4/56 | Burleson | 138—109 |
| 2,787,289 | 4/57 | Press | 285—149 |
| 2,815,227 | 12/57 | Cullen | 285—45 |
| 2,825,364 | 3/58 | Cullen | 285—149 |
| 2,888,277 | 5/59 | Melsom | 285—256 |
| 2,926,029 | 2/60 | St. Clair | 285—256 |
| 3,083,989 | 4/63 | Press | 285—149 |

FOREIGN PATENTS

| | | |
|---|---|---|
| 213,018 | 11/08 | Germany. |
| 68,987 | 11/51 | Netherlands. |
| 792,029 | 3/58 | Great Britain. |
| 215,402 | 6/58 | Australia. |
| 215,500 | 6/58 | Australia. |

CARL W. TOMLIN, *Primary Examiner.*